Figure 1:
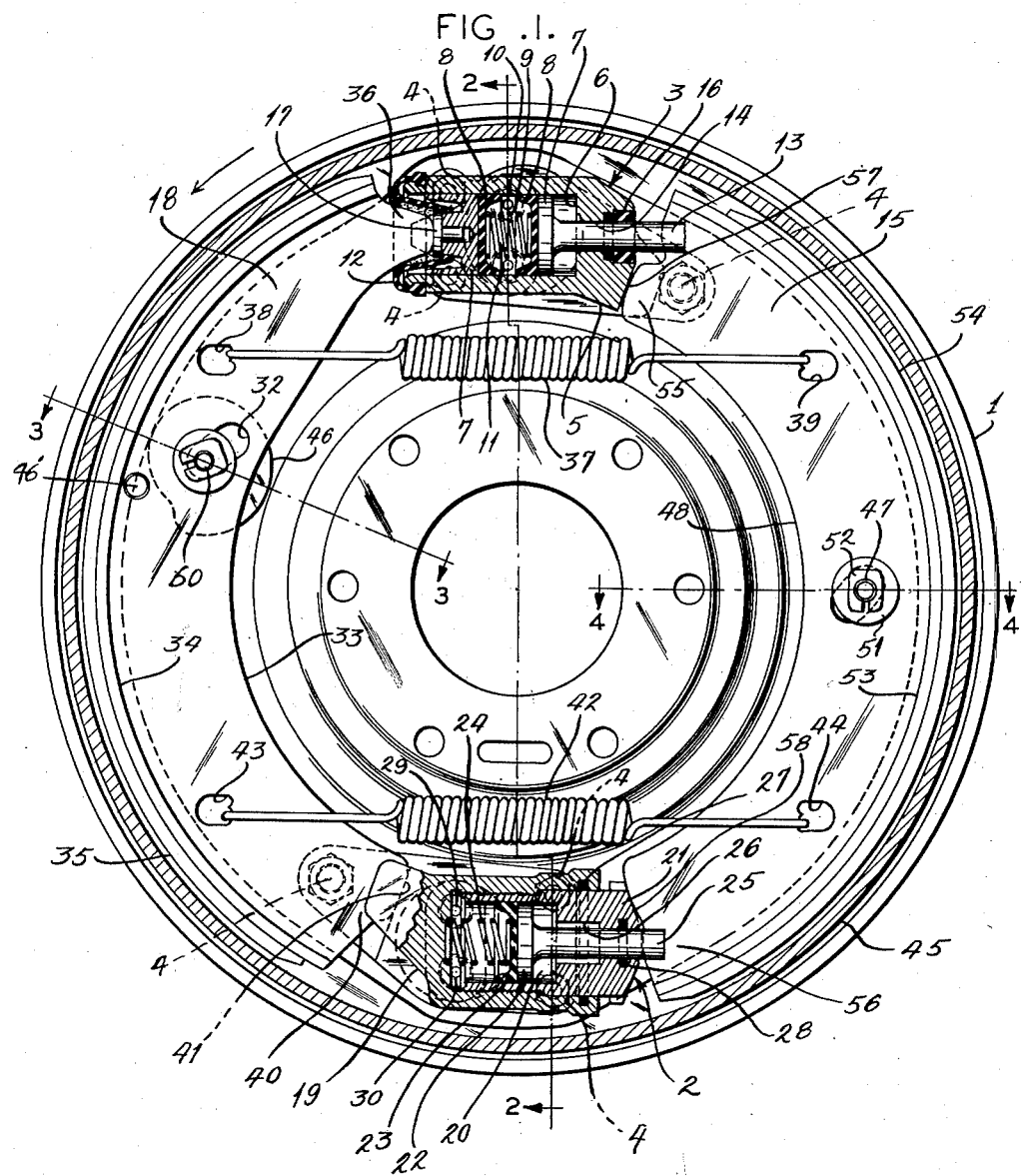

Jan. 29, 1952  S. SCHNELL  2,583,888
BRAKING MECHANISM

Filed April 3, 1950  2 SHEETS—SHEET 1

INVENTOR:
Steve Schnell,
By Carr & Carr & Gravely,
HIS ATTORNEYS.

Jan. 29, 1952 S. SCHNELL 2,583,888
BRAKING MECHANISM
Filed April 3, 1950 2 SHEETS—SHEET 2
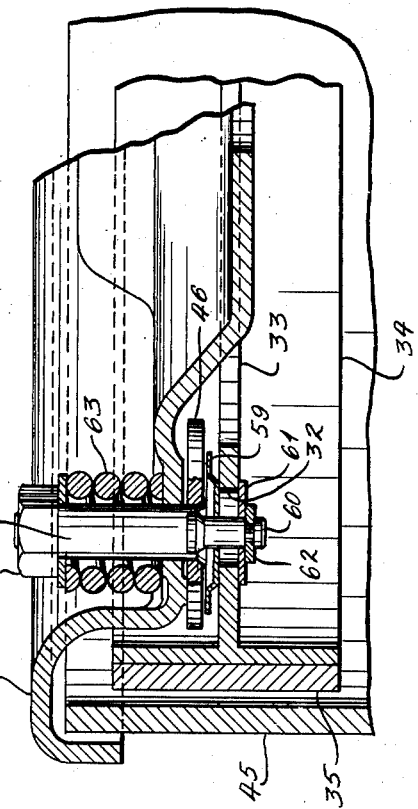
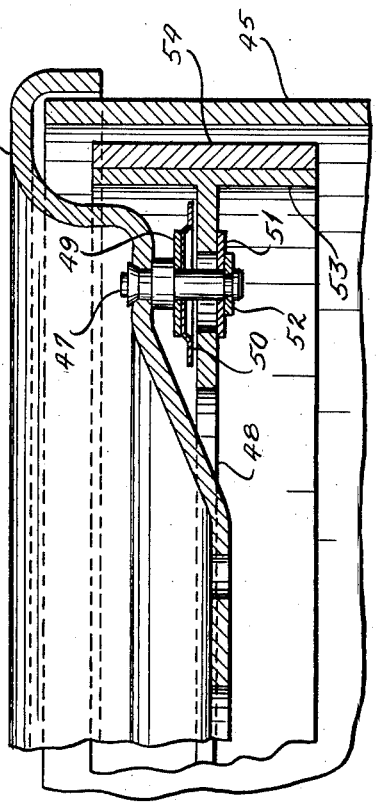
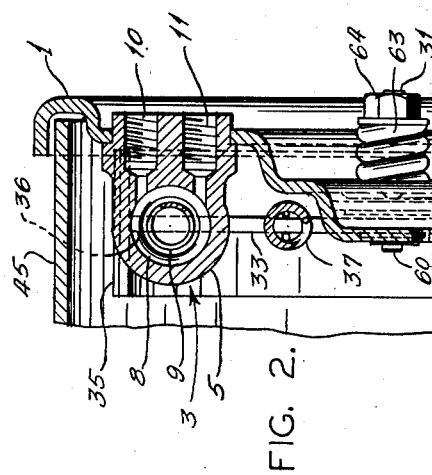
INVENTOR:
Steve Schnell
By Carr & Carr & Gravely
HIS ATTORNEYS.

Patented Jan. 29, 1952

2,583,888

UNITED STATES PATENT OFFICE 2,583,888

BRAKING MECHANISM

Steve Schnell, Kirkwood, Mo., assignor to Wagner Electric Corporation, St. Louis, Mo., a corporation of Delaware Application April 3, 1950, Serial No. 153,595

3 Claims. (Cl. 188—152)

This invention relates to hydraulic braking mechanism for motor vehicles and is more particularly directed to an improved brake construction.

One of the objects of the invention is to provide a brake construction that will permit equal energization of both brake shoes when said brake is applied with the motor vehicle moving in a forwardly direction.

Another object of the invention is to produce a two-shoe brake wherein at least one of said shoes is self-centering during a braking application.

Still another object of the invention is to provide a simplified brake construction wherein the abutments for receiving the brake shoe torque are a part of the fluid motors which are responsible for the initial actuation of the brake shoes.

A further object of the invention is to provide novel means associated with the abutment means for receiving the torque of the brake shoes and for adjusting lining wear of one or more of said brake shoes.

This invention consists in the provision of a hydraulic brake for automotive vehicles having a pair of brake shoes supported on a backing plate and adapted for movement toward and away from a brake drum, the movement being accomplished by a fluid motor interposed between the adjoining ends of the brake shoes, the motors being so organized and arranged that two shoes are effective during the forward rotation of the brake drum, one shoe being more effective than the other during reverse rotation and wherein the brake thrust or torque is taken by the fluid motors applying the shoes in either direction of drum rotation.

In the drawings:

Fig. 1 is an elevational view of a brake assembly with parts in section to show detail, Fig. 2 is a sectional view taken substantially along the line 2—2 of Fig. 1, Fig. 3 is a sectional view taken substantially along the line 3—3 of Fig. 1; and Fig. 4 is a sectional view taken substantially along the line 4—4 of Fig. 1.

The invention is embodied in the several views of the drawings in which the numeral 1 designates the backing plate for the brake assembly which is normally attached to the motor vehicle axle (not shown). This plate supports fluid motors 2 and 3 and the fluid motors are each attached to the backing plate 1 by mounting screws 4. The motor 3 consists of a body member 5 having a cylindrical bore 6 in which pistons 7 are slidably mounted. Piston packing cups 8 are mounted in bore 6 in contact with the opposed faces of pistons 7 for preventing leakage of fluid pressure past the pistons, and interposed between said cups for holding them in contact with the faces of said pistons is a spring 9. The cylindrical bore 6 is provided with an inlet port 10 and an outlet port 11, each communicating with bore 6 at a point between the aforementioned packing cups 8. A boot 12 is provided around the left end of bore 6 for preventing ingress of dirt and other foreign matter into the bore. The right hand piston 7 is provided with a piston rod 13 extending through a small bore 14 in the body member 5 and sufficiently beyond the body member for engagement with the end of a brake shoe 15 to be later described. A seal 16 surrounds the piston rod 13 of piston 7 for preventing the possibility of foreign matter entering the bore 6. The left hand piston 7 is provided with a hardened insert 17 which constitutes a workable connection between the piston 7 and the brake shoe 18 to be hereinafter described.

The fluid motor 2 is located on the backing plate 1 diametrically opposite the fluid motor 3 and consists of a body member 19 secured to the backing plate 1 by mounting screws 4. The body member has a cylindrical bore 20 therein, the open end of said bore being closed by a cylindrical plug 21 having a cylindrical bore in which a piston 22 is slidably mounted. A packing cup 23 is in contact with piston 22 and prevents the escape of fluid past the piston, a spring 24 holding cup 23 in contact with piston 22. The piston 22 is also provided with a piston rod 25 protruding beyond the end of the body member 19 through a bore 26 in the plug 21 a sufficient distance that it has working contact with the brake shoe 15. The plug 21 is provided with a fluid seal 27 for preventing loss of pressure fluid between the plug and the body member 19, and a seal 28 in bore 26 about rod 25 excludes foreign matter which might otherwise get into the bore 20. An inlet port 29 and a bleeder port 30 are provided near the closed end of bore 20. The inlet port 29 of fluid motor 2 is connected by a suitable conduit (not shown) to the outlet port 11 of fluid motor 3.

Adjacent to the left end of the fluid motors 2 and 3 is a forward shoe 18 slidably anchored to the backing plate 1 by a stud 31 which extends through an aperture 32 (Fig. 3) provided in the web portion 33 of shoe 18. Attached to the web portion of shoe 18 is a table portion 34 to which the friction lining member 35 is secured. The toe portion 36 of the shoe 18 is held in contact with insert 17 of fluid motor 3 by a return spring 37, one end of which is hooked in aperture 38 cut in web 33 of shoe 18, the opposite end of the spring being hooked in aperture 39 cut in reverse shoe 15. The heel portion 40 of shoe 18 is in contact with abutment 41 forming a part of the body member 19 of fluid motor 2. It is held in contact therewith by another return spring 42 hooked in apertures 43 and 44 in shoes 15 and 18 in the same manner as return spring 37. The shoe 18 is manually adjustable in relation to brake drum 45 by means of the adjusting cam 46 mounted on stud 31.

Diametrically opposite the forward shoe 18 is reverse shoe 15, the ends of which are adjacent to the fluid motors 2 and 3. The reverse shoe is slidably mounted on the backing plate 1 on stud 47 secured thereto in a suitable manner. This studs extends through an aperture cut in web 48 of shoe 15. A washer 49 abuts a collar formed on stud 47 and a spring washer 50 is interposed between web 48 and washer 49. A washer 51 is disposed on the opposite side of web 48 and a C washer 52 holds the washers and shoe 15 in assembled relation, the C washer being secured to the stud in the conventional manner. The web 48 has a table 53 secured thereon to which a friction lining 54 is secured in the customary manner. The toe 55 of the reverse shoe is held in contact with the piston rod 13 of piston 7 by return spring 37. The heel 56 on shoe 15 is held in contact with piston rod 25 by return spring 42.

An abutment 57 is formed on the body member 5 of fluid motor 3 having a surface thereon radially of the center of the backing plate 1. An abutment 58 formed on plug 21 of fluid motor 2 has a surface thereon radially of the backing plate, thus allowing the brake shoe 15 to self-center during a braking operation. The brake shoe 15 is manually adjusted by screwing the plug 21 inwardly or outwardly, as the case may be, for obtaining the proper clearance between the friction lining 54 of shoe 15 and the brake drum 45 and by reason of the conical shape of the right hand end of plug 21, the abutment 58 will always be substantially radially of the center of the backing plate 1. The forward shoe 18 is always in engagement with abutment 41 of fluid motor 2 which is substantially radially of the center of the backing plate, thus permitting a self-centering action of said shoe 18.

The shoe 18 is adjusted toward and away from brake drum 45 by cam 46 secured to stud 31. The cam engages a pin 46' secured to web 33 of the shoe 18 as the cam is rotated, thereby moving the shoe 18 outwardly. The angle of contact between pin 46' and cam 46 is opposite to the angle of contact between heel 40 of shoe 18 and abutment 41. If this were not true, when cam 46 is turned in a counter-clockwise direction, the shoe would be allowed to move upwardly when a cam 46 directly engages the table 34. The pin serves as a connecting means between the cam 46 and the table 34.

The stud is provided with an extension 60 that projects through aperture 32 in web 33, a spring washer 59 being interposed between cam 46 and the web 33. A washer 61 and a C washer 62 is applied to the projection 60, the latter washer engaging a head thereon. A spring 63 is placed on the stud 31, and nut 64 threaded to stud 31 tensions the spring. The brake shoe 18 is adjusted in the usual manner of this well-known type of adjusting mechanism.

The operation of the above device is as follows:

Assuming that the vehicle on which the brake is assembled has a forward direction of motion, indicated by the arrow, pressure fluid is forced into the inlet port 10 of fluid motor 3 from the pressure source, such as a standard type master cylinder (not shown). A portion of the pressure fluid entering the bore 6 will flow through outlet 11, the interconnecting line (not shown), to the inlet port 29 of the fluid motor 2 to force piston 22 toward the right. Simultaneously, the pressure fluid in bore 6 of fluid motor 3 forces piston 7 toward the ends of the cylinder bore 6. The left hand piston 7 of the fluid motor will, by reason of its engagement with the toe of shoe 18, force the shoe outwardly into contact with the brake drum 45 while the piston 22 of fluid motor 2 simultaneously forces the heel 56 of the reverse shoe 15 outwardly into engagement with the brake drum. Due to the direction of rotation of the brake drum with respect to the friction members 35 and 54 on brake shoes 18 and 15, the shoes will be carried with the drum for creating a self-energization which produces an additional braking torque, the torque of the forward shoe 18 being transmitted through the heel 40 of the shoe to the abutment 41 of the fluid motor 2 at the same time the torque created in reverse shoe 15 is being transmitted to the abutment 57 on fluid motor 3, which force also prevents the right hand piston 7 moving the toe 55 of shoe 15 outwardly. Consequently, a portion of the torque created in the brake shoe 15 is absorbed by the right hand piston 7, the majority of said torque being transmitted to the abutment 57 of fluid motor 30. Since the abutment 41 of fluid motor 2 and the abutment 57 of fluid motor 3 are radially of the center of the backing plate 1, shoes 15 and 18 center themselves in such a manner that even wear of the friction members 35 and 54 will occur.

When the vehicle moves in a reverse direction, the operation of the master cylinder of the brake system will force pressure fluid, as previously described, into the fluid motors 2 and 3, forcing the right hand piston 7 of fluid motor 3 toward the right against the toe 55 of shoe 15, moving the shoe outwardly into engagement with the brake drum 45 while the left hand piston 7 of fluid motor 3 attempts to force the toe 36 of shoe 18 against the brake drum. The shoe 15 is self-energized in a similar manner as described in the forward direction with heel 56 of the shoe remaining in contact with abutment 58 of fluid motor 2 and, as previously described, shoe 15 will self-center itself by reason of the radial abutment 58. Although moved into engagement with the drum 45, shoe 18 is slightly de-energized because it is moved relative to the rotating drum 45 and fails to produce a braking effect equivalent to that created by the reverse shoe 15. However, the braking effort obtained from the self-energizing reverse shoe 15 and the slightly de-energized shoe 18 is quite sufficient inasmuch as the speeds in reverse direction are far below the forward speeds.

What I claim is:

1. A brake mechanism comprising a backing plate, a brake drum, a pair of brake shoes slidably mounted on said backing plate and adapted for engagement with said brake drum, a pair of fluid motors secured to said backing plate, one of said motors being located between the adjoining ends of each of said shoes for moving said shoes into engagement with said drum, an abutment integral with each of said motors and having a surface thereon extending radially of the center of said backing plate and brake drum and with which one end of each of said shoes engages, means adjustably mounted on one of said motors and having a surface thereon extending radially of the center of said backing plate and brake drum with which the other end of one of said shoes engages for adjusting said shoe relative to said backing plate; and means for disengaging said shoes from said brake drum.

2. A braking mechanism comprising a backing plate, a brake drum, a pair of brake shoes slidably mounted on said backing plate and adapted for engagement with said drum, a fluid motor having a pair of pistons therein and mounted on said backing plate, a rod on one of said pistons, said motor being disposed between one of the adjoining ends of each of said shoes so that one of said pistons directly engages one end of one of said shoes, the piston rod directly engaging one end of the other of said shoes, a fluid motor disposed between the other ends of each of said shoes, a piston in said motor having a rod thereon engaging the other end of the other of said shoes, an adjustable member threaded into the second mentioned motor having a surface thereon extending radially of the center of said backing plate and drum and engageable with the other end of the other shoe which is also engageable with the piston rod of said first mentioned motor, said member adjusting the position of the last mentioned shoe relative to said backing plate; and means on said second mentioned motor having a surface thereon extending radially of the center of said drum and backing plate engageable with the other end of the shoe directly engaged by one of the pistons in said first mentioned motor.

3. A braking mechanism comprising a backing plate, a brake drum, a pair of brake shoes slidably mounted thereon and adapted for engagement with said brake drum, a fluid motor mounted on said backing plate and disposed between the adjoining ends of said brake shoes, a pair of pistons in said motor, one of which engages one end of one of said shoes, a rod in the other piston that engages one end of the other of said shoes, a fluid motor mounted on said backing plate and disposed between the other adjoining ends of said shoes, a cylindrical plug member provided with a bore and threaded into said motor, a piston in said bore, a rod on said piston engageable with the other end of the shoe with which said first mentioned rod engages, means on said first mentioned fluid motor and on said plug having a surface thereon extending radially of the center of said backing plate and drum adapted to be engaged by the ends of one of said shoes; and means on the motor having the plug therein provided with a surface extending radially of the center of said backing plate with which one end of the other shoe is in engagement.

STEVE SCHNELL.

REFERENCES CITED

The following references are of record in the file of this patent:

UNITED STATES PATENTS

| Number | Name | Date |
|---|---|---|
| 635,684 | Herschmann | Oct. 24, 1899 |
| 1,764,178 | Loughead | June 17, 1930 |
| 2,030,340 | White | Feb. 11, 1936 |
| 2,074,434 | Schnell | Mar. 23, 1937 |
| 2,120,676 | Oliver | June 14, 1938 |
| 2,166,804 | Dick | July 18, 1939 |
| 2,192,293 | Waseige | Mar. 5, 1940 |
| 2,382,268 | Stelzer | Aug. 14, 1945 |